Nov. 15, 1966  E. S. SELANDER ETAL  3,284,895
PORTABLE CLAMP AND CUTTER FOR ELECTRICAL FLEXIBLE TUBING
Filed March 29, 1965  2 Sheets-Sheet 1

INVENTORS
EDSEL S. SELANDER
BY GERALD E. CARMACK

William R. Piper
ATTORNEY

INVENTORS
EDSEL S. SELANDER
BY GERALD E. CARMACK

William R. Piper
ATTORNEY

United States Patent Office 3,284,895
Patented Nov. 15, 1966

3,284,895
PORTABLE CLAMP AND CUTTER FOR
ELECTRICAL FLEXIBLE TUBING
Edsel S. Selander, 4821 Yellowstone Park Drive, and
Gerald E. Carmack, 4839 Yellowstone Park Drive,
both of Fremont, Calif.
Filed Mar. 29, 1965, Ser. No. 443,311
2 Claims. (Cl. 30—90.2)

The present invention relates to improvements in a portable clamp and cutter for electrical flexible tubing and it consists in the combination, construction and arrangement of parts as hereinafter described and claimed.

It has been the practice of electricians when installing flexible tubing in a building to feed it through the wall, ceiling or floor from one outlet box to another and then grasp the tubing near the box with one hand and use a hack saw with the other and make a 45° angle cut in one of the tubing loops near the portion gripped. The 45° angle cut end of the tubing is now attached to a connector that is secured to the outlet box. It is vital that the connection between the connector and the tubing be a permanent one in order to pass inspection and to remain connected so long as the building stands or until a change is made in the connection.

The disadvantages of using a hack saw for cutting the tubing lies in the fact that the cut must be at approximately a 45° angle to the tube axis in order that only one loop or coil of the tubing be severed. The sides of the adjacent loops or coils in a tubing overlap each other to a slight extent and it is practically impossible to cut completely through one coil without cutting into portions of the adjacent loops thereby weakening them. Also the cut end of the coil or loop is at a 45° angle to the tube axis and this will create a tendency for the cut end of the loop to ride up over the nut portion of the connector when the tubing is secured thereto and to spread the cut end of the loop to such an extent that the tube end will not grip the connector tightly. The ordinary vibration to which a building is subjected to over the years might be sufficient to disconnect the end of the tubing from the connector and create a fire hazard.

Because of this possible situation, certain counties are requiring the flexible tubing to be cut off at right angles to the tube axis. This is difficult to do with a hacksaw while the electrician holds the tubing. An object of our invention is to provide a portable clamp and cutter for electrical flexible tubing that can firmly grip the portion of the tubing to be cut so as to hold this portion rigid, and then to cut the tubing at right angles to its axis and at a point adjacent to the gripped portion so there can be no flexing of the tubing at the point of cutting. The portable device can be placed near the outlet box to which the cut end of the tubing is to be attached so as to permit the electrician to cut the tubing near the box and then permit him to quickly secure the tubing end to the connector that projects from the box. Time can be saved as against using the hacksaw. A tubing cut at right angles to its axis will not have cuts in adjacent coils or loops for weakening them and the cut end can be secured to the connector without the end loop spreading and thereby weakening the connection. The cut end will not spread when attached to the connector and the connection is so strong that it is necessary to use pliers if it is desired to remove the tubing end from the connector. Therefore building vibrations will have no effect in breaking the connection between the tubing end and the connector.

In one form of our invention, the clamp for the tubing is slidably mounted on a base to which an electrically operated saber saw is attached. The clamp will lock onto the tubing when applied by the electrician and this leaves both of his hands free to move the clamp past the reciprocating saw blade for causing the latter to cut the tubing at right angles to its axis. A guard is provided for the saw and a novel rest or support for the portion of tubing projecting beyond the clamp when the latter grips the tubing is provided for aiding in holding this portion from vibrating during the cutting operation.

Another form of our invention shows the clamp as having a pivotal connection with the housing for the electric motor. The clamp can be locked onto the portion of the tubing to be cut for holding the tubing from flexing and then the clamp can be swung through an arc for moving the gripped tubing past the reciprocating saw blade for causing the latter to cut the tubing at right angles to its axis.

Other objects and advantages will appear as the specification continues. The novel features of the invention will be set forth in the appended claims.

Drawings

For a better understanding of our invention, reference should be made to the accompanying drawings, forming part of this specification, in which.

While we have shown only the preferred forms of our invention, it should be understood that various changes, or modifications, may be made within the scope of the annexed claims without departing from the spirit thereof.

Detailed description

Figure 1:
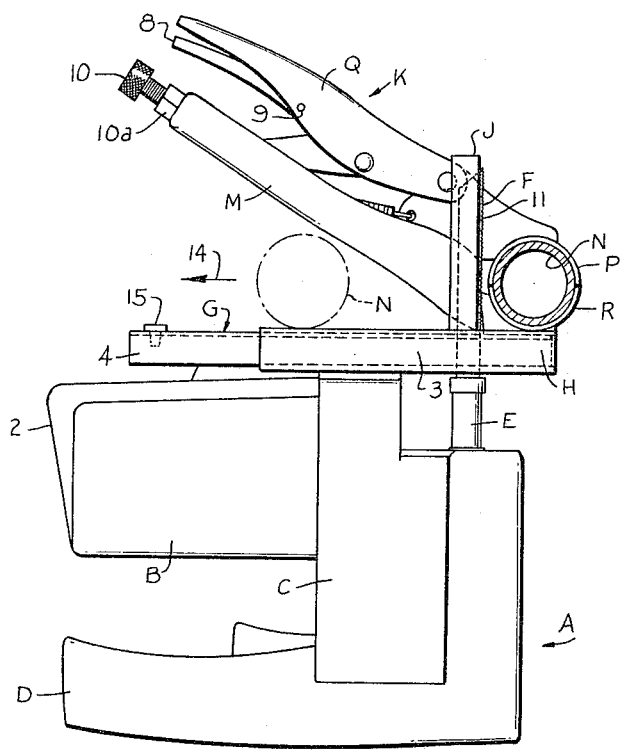
FIGURE 1 is a side elevation of a portable electric saber saw with a lock-grip pliers mounted on a sliding platform which in turn is slidably mounted on a base that is carried by the saber saw.
Figure 2:
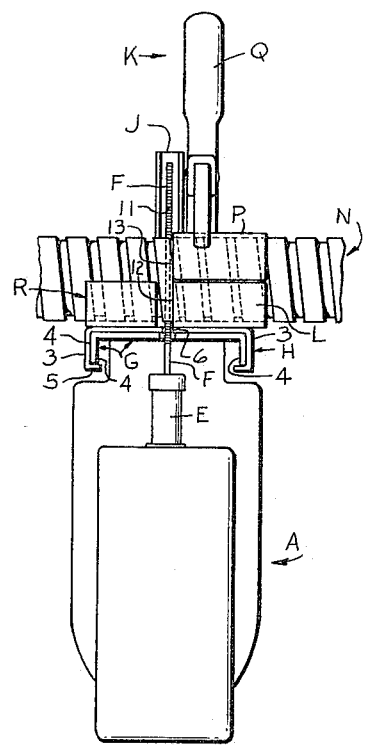
FIGURE 2 is a front elevation of FIGURE 1 when looking at the right hand side of FIGURE 1.
Figure 3:
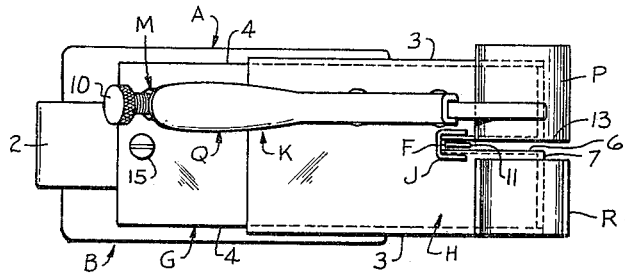
FIGURE 3 is a top plan view of the device shown in FIGURE 1.

In carrying out our invention, we make use of a portable electric saber saw, the housing of which is indicated generally at A in FIGURES 1, 2 and 3. This saber saw has an electric motor B, a gear reducing mechanism C and a handle D. The portable electric saw also has a guide E for a reciprocating saw F. A trigger 1 is mounted in the handle D, see FIGURE 1 and when the operator moves the trigger, he will close a switch that connects the motor B to a source of electric current, not shown, and this will cause the saw blade F to reciprocate at the desired speed. The portable electric saber saw has a base G that is mounted on a bracket 2 that in turn is secured to the housing for the electric motor B.

We mount a sliding platform H on the base G and FIGURE 2 shows this platform as having sides 3—3 that slidably contact with the sides 4—4 of the base G. The sides 3—3 of the sliding platform H have inwardly turned flanges 5—5 for slidably securing the platform H to the base. FIGURE 3 shows the sliding platform H provided with a slot 6, that extends inwardly from the front edge 7 of the platform and this slot slidably receives the reciprocating saw blade F. A vertical saw guard J extends upwardly from the sliding platform H and is rigidly secured thereto. The saw guard J is substantially U-shaped in cross section.

We mount a self-locking clamp or lock grip pliers indicated generally at K on the sliding platform H at a point adjacent to the slot 6, see FIGURE 3. The lock-grip pliers are of a standard construction and a stationary jaw L is permanently secured to the sliding platform H by solder or the like and this jaw has a handle M that extends upwardly at an angle to the plane of the sliding platform, see FIGURE 1. The stationary jaw L is semi-cylindrical in shape and has a length which is considerably greater than the length of the jaw usually provided with the lock-grip pliers. The purpose of this extra length of the stationary jaw L is to receive a sufficient length of an electrical flexible tubing N, see FIGURE 2, to hold the portion of the tubing gripped from flexing.

A movable jaw P is also semi-cylindrical in shape and it has the same length as the jaw L, see FIGURE 2. The movable jaw is carried by a second handle Q for the lock-grip pliers K. The advantage of the lock-grip pliers K lies in the fact that when the handle Q is moved toward the handle M for causing the jaws P and L to grip the flexible conduit N, the pliers are self-locking and will continue to grip the flexible conduit like a vice without the need of the operator continuing to move the handle Q toward the handle M. At the same time the lock-grip pliers has a release lever 8 that is pivotally mounted at 9 on the handle Q. When this release lever 8 is actuated, it will release the movable jaw P and permit this jaw to be swung away from the stationary jaw L for freeing the conduit N from the jaws. An adjusting screw 10 is carried by the free end of the handle M and this screw may be adjusted for moving the jaws L and P toward or away from each other to accommodate the conduits N or the like of different sizes. A lock nut 10a is mounted on the adjusting screw 10 and can be tightened against the end of the handle M for preventing accidental rotation of the adjusting screw.

It will be noted from FIGURES 1 and 3 that when the sliding platform H is moved to the right, with respect to the base G, until the saw blade F is received in the saw guard J, then the jaws will be disposed on the right hand side of the saw blade when looking at FIGURE 1 and they can grip the conduit N preparatory to moving the conduit against the teeth 11 of the saw blade for cutting the conduit at right angles to the axis of the conduit. FIGURE 2 shows the saw blade F disposed adjacent to the ends 12 and 13 of the stationary jaw L and the movable jaw P.

The operator in cutting the conduit N moves the lock-grip pliers K to the left in FIGURE 1 in the direction of the arrow 14 and this will move the conduit N past the reciprocating saw F and the teeth 11 of the saw will cut the conduit. We have found that the conduit N is held in a more rigid position when the portion of the conduit that projects beyond the edges 12 and 13 of the jaws L and P is received in a semi-cylindrical saddle indicated at R. The axis of the semi-cylindrical saddle R coincides with the axis of the stationary jaw L and also coincides with the axis of the tubing N when the latter is gripped by the jaws L and P. The saddle prevents the projecting portion of the conduit N from flexing during the cutting operation.

Operation

It will be noted that the saw guard J encloses the reciprocating saw blade F when the lock-grip pliers K and the sliding platform H are moved into a position for permitting the jaws L and P to receive the conduit N that is to be cut. After the conduit has been clamped in place, the operator holds the portable electric saber saw by gripping the handle D with one hand and then he grips the lock-grip pliers K with the other hand and moves the pliers with the sliding platform in the direction of the arrow 14 for causing the reciprocating blade F to cut the conduit in a plane paralleling the edges 12 and 13 of the jaws, this plane being at right angles to the axis of the gripped portion of the conduit. A removable screw or stop 15 is mounted in the base 4 and limits the movement of the sliding platform H to the left in FIGURE 1.

Figure 4:
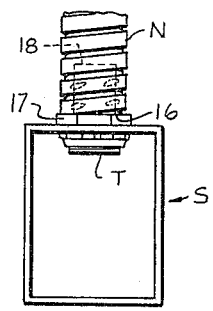
FIGURE 4 illustrates an electric outlet box having one end of an electric flexible tubing secured to the box by a connector.

In the wiring of buildings, the conduit N has one end connected to an electric outlet box of the type shown at S in FIGURE 4 and then the conduit is fed through the ceiling or wall or floor from this box to another box. The electrician then can use the portable electric saber saw A and move it near to the second box and then grip the conduit portion near the box by means of the lock-grip pliers K. We have already explained how the jaws L and P will grip the portion of the conduit adjacent to the saw blade F so there will be no flexing of this portion. We have also explained how the portion of the conduit N projects beyond the edges 12 and 13 of the jaws and will be received in the saddle R and the saddle will prevent this portion from flexing during the cutting operation. The cutting of the conduit can be quickly accomplished by merely sliding the platform H in the direction of the arrow 14 as already explained. The conduit N will therefore have a cut that extends at right angles to its axis. The conduit has its end then mounted on a connector T shown in FIGURE 4 and the right angle cut end of the conduit will bear against the side of a flange 17 on the connector. The cut end 16 will have no tendency to ride up over the periphery of the flange when the conduit is slipped over the end 18 of the connector T. A secure fastening of the conduit to the connector is thus assured. A nut 19 is mounted on the inner threaded end of the connector T, and secures it to the outlet box S.

In FIGURES 5 to 8 inclusive, we show a modified form of our invention. In this form a portable electric reciprocating saw has a housing indicated generally at U in FIGURES 5, 6 and 7, this saw having an electric motor 25 and one end of the motor is provided with a hand-grip portion, not shown.

A gear reducing mechanism is indicated at 26 and a bracket V is attached to the saw housing for the gear reducing mechanism 26. The bracket has parallel supporting walls 27 and these walls are spaced apart and receive an arm 28 therebetween, see FIGURE 6. The arm 28 is pivoted at 29 and the free end of the arm is welded to the jaw P of the lock-grip pliers K which is the same type of pliers shown in FIGURES 1 to 3 inclusive. Similar parts of the lock-grip pliers are therefore given like letters and numerals and no further detailed description of the pliers need be given.

The gear reducing housing 26 has a guide 30 extending from one end thereof and a reciprocating saw blade W extends beyond the guide.

Figures 5, 6:
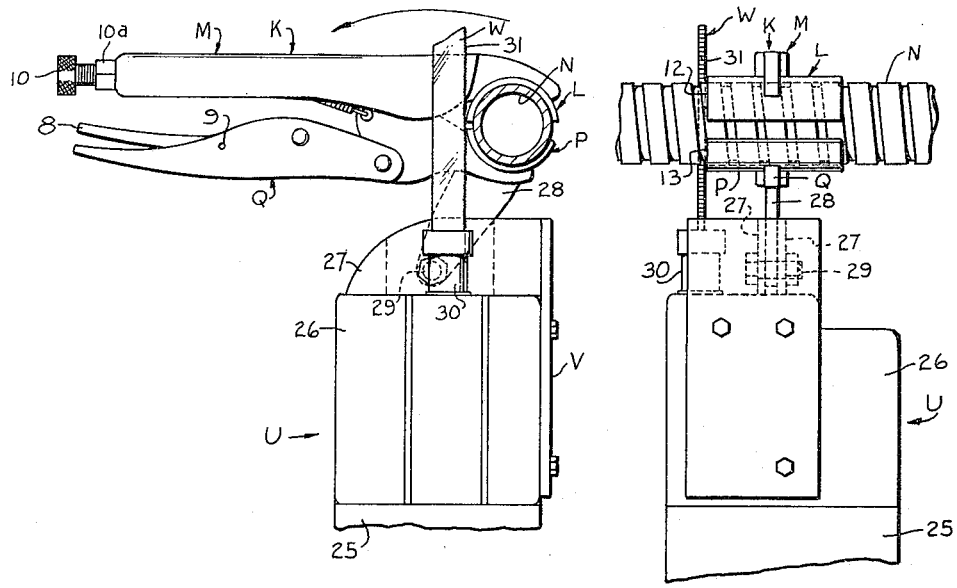
FIGURE 5 is a modified form of our invention and shows a self-locking clamp or lock-grip pliers provided with an arm that is pivotally connected to a bracket that in turn is mounted on a portable electric reciprocating saw.
FIGURE 6 is a front elevation of FIGURE 5 when looking from the right hand side of this figure.

FIGURE 6 clearly shows how the jaws L and P of the lock-grip pliers K receive the conduit N. The length of the jaws is such as to rigidly hold the portion of the conduit that is disposed adjacent to the saw blade W. The edges 12 and 13 of the jaws L and P extend at right angles to the axis of the gripped portion of the conduit and the saw blade W will sever the conduit N in a plane that parallels these edges.

The operation of this form of the device is somewhat the same as the form shown in FIGURES 1 to 3 inclusive, the only difference being that the lock-grip pliers K in the modified form of the invention will swing about the pivot point 29 when the conduit N is moved past the cutting teeth 31 of the saw W. After the cutting operation has been completed, the quick release lever 8 may be actuated for freeing the jaws L and P from the conduit. The end of the conduit will be cut at right angles to its axis.

Figures 7, 8:
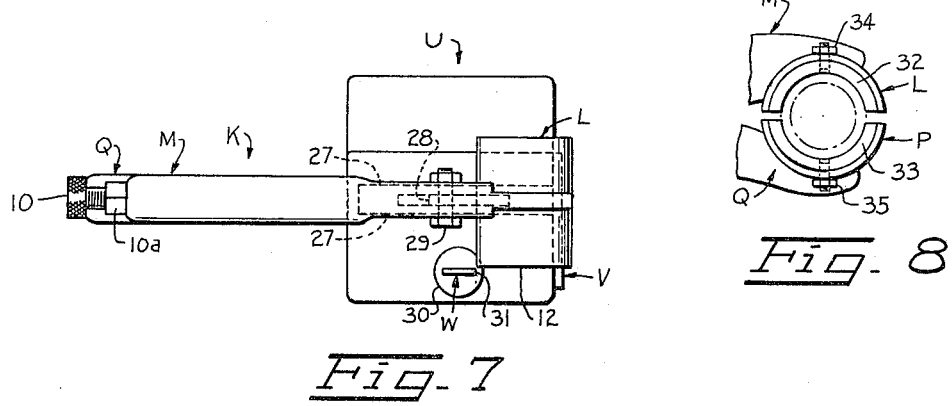
FIGURE 7 is a top plan view of the device shown in FIGURE 5.
FIGURE 8 is a view of the two semi-cylindrical jaws in the self-locking clamp and these jaws are provided with liners so as to grip electrical flexible tubing that is of a smaller diameter.

In FIGURE 8, we show the jaws L and P provided with liners 32 and 33, respectively. These liners are held in place by set screws 34 and 35 or other suitable fastening means. The liners 32 and 33 can be semi-cylindrical in cross section or they can be provided with a V-shaped groove, not shown. Our device, shown in FIGURES 1 to 3 inclusive and FIGURES 5 to 7 inclusive can be used by plumbers for cutting pipe. The device is also adaptable for other uses.

We claim:
1. In combination:
 (a) a portable housing enclosing a motor;
 (b) a bracket carried by said housing;
 (c) a reciprocating saw blade having one end operatively connected to said motor, said saw blade having a portion slidable in a blade guide that is carried by said housing;
 (d) an arm swingably carried by said bracket and being swingable in a plane that is parallel to the blade of said saw blade; and
 (e) flexible conduit gripping pliers carried by said arm; the two jaws of said pliers being semi-cylindrical in cross section with their concave faces being disposed opposite each other, said jaws when closed having a common axis that extends at right angles to said plane defined by said swingable arm;
 (f) said jaws being sufficiently long to grip a length of the flexible conduit and prevent the gripped portion from flexing;
 (g) one end of each jaw lying in a plane that lies flush with the side of said reciprocating saw blade that is disposed nearest to said jaw ends;
 (h) said arm permitting the pliers to be swung for causing the jaws to move the gripped conduit portion with respect to said reciprocating saw blade so that the latter will cut the conduit in a plane at right angles to the axis of the gripped conduit portion and adjacent to the jaw ends disposed nearest to said saw blade.

2. The combination as set forth in claim 1: and in which
 (a) said pliers having a handle for each jaw, the handles being pivoted together and extended at right angles to the lengths of said jaws; and
 (b) said handles being connected to said jaws substantially midway between the jaw ends.

References Cited by the Examiner

UNITED STATES PATENTS

| | | | |
|---|---|---|---|
| 1,635,165 | 7/1927 | Adamsky | 83—409 X |
| 2,076,435 | 4/1937 | Nelson | 83—409 X |
| 2,176,646 | 10/1939 | Thatcher | 30—90.5 |
| 2,227,844 | 1/1941 | Roche | 30—92 |
| 2,324,380 | 7/1943 | Frei | 83—409 X |
| 2,329,729 | 9/1943 | Saucke | 30—92 |
| 2,396,442 | 3/1946 | Shaver et al. | 30—91 |
| 2,687,560 | 8/1954 | Palley | 30—90.5 |
| 2,696,852 | 12/1954 | Dunton | 143—51 |
| 2,768,549 | 10/1956 | Showers | 81—375 |
| 2,989,806 | 6/1961 | Davis | 30—90.5 |
| 3,066,564 | 12/1962 | Carpenter | 83—175 |
| 3,159,071 | 12/1964 | Bateman | 83—411 |
| 3,195,382 | 6/1965 | Rommel et al. | 83—373 |
| 3,212,185 | 10/1965 | Keiter | 83—411 |

WILLIAM FELDMAN, *Primary Examiner.*

MYRON C. KRUSE, *Assistant Examiner.*